(12) United States Patent
Poncini et al.

(10) Patent No.: US 7,463,592 B2
(45) Date of Patent: Dec. 9, 2008

(54) PROTOCOL FOR EXCHANGING CONTROL DATA TO MITIGATE INTERFERENCE PROBLEMS IN WIRELESS NETWORKING

(75) Inventors: Victoria M. Poncini, Renton, WA (US); Poovanpilli G. Madhavan, Bellevue, WA (US); Abhishek Abhishek, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 815 days.

(21) Appl. No.: 11/004,428

(22) Filed: Dec. 3, 2004

(65) Prior Publication Data

US 2006/0120302 A1   Jun. 8, 2006

(51) Int. Cl.
*H04B 1/10* (2006.01)
*H04Q 7/24* (2006.01)

(52) U.S. Cl. .............. 370/252; 370/338; 370/465; 455/63.1; 455/67.13; 455/296

(58) Field of Classification Search .................. None
See application file for complete search history.

(56) References Cited

U.S. PATENT DOCUMENTS

| | | | |
|---|---|---|---|
| 3,976,981 | A | 8/1976 | Bowden |
| 6,473,410 | B1 | 10/2002 | Sakoda |
| 6,628,626 | B1 | 9/2003 | Nordgaard |
| 6,842,621 | B2 | 1/2005 | Labun |
| 6,999,438 | B2 | 2/2006 | Nounin |
| 7,027,827 | B2 | 4/2006 | Bonta |
| 7,035,593 | B2 * | 4/2006 | Miller et al. .............. 455/67.11 |
| 7,035,670 | B2 | 4/2006 | Kikuma |
| 7,079,812 | B2 * | 7/2006 | Miller et al. ............... 455/63.1 |
| 7,116,943 | B2 * | 10/2006 | Sugar et al. ............... 455/67.11 |

(Continued)

FOREIGN PATENT DOCUMENTS

EP    1065897    1/2001

(Continued)

OTHER PUBLICATIONS

WO 2004/077724 A (Backes, Floyd; Autocell Laboratories, Inc; Bridge, Laura; Callahan, Paul) Sep. 2004,* p. 8, line 15—p. 10, line 4 *p. 11, line 1—page 13, line 13 *p. 14,, line 10—line 21 * 8 figures 1,3,14,16 *.

(Continued)

*Primary Examiner*—Chau Nguyen
*Assistant Examiner*—Robert C Scheibel
(74) *Attorney, Agent, or Firm*—Workman Nydegger

(57) ABSTRACT

Described is a protocol by which wireless network communication devices comprising peer nodes (such as a computer system and an access point) cooperatively exchange information about RF interference detected in the network. The protocol administers the exchange of formatted control data corresponding to the detected interference among computing nodes running a service capable of processing the control data. A peer table is used to maintain locally-obtained and remotely-obtained control data. Records in the peer table are arranged with different levels of granularity with respect to interference and networking information. The interference information collected through the cooperative protocol may then be used by peer devices in the network to adapt to mitigate interference-related problems. The protocol also provides for discovery of peer node capabilities, including a negotiable transport for the control data that may be different from the main data channel transport.

31 Claims, 15 Drawing Sheets

U.S. PATENT DOCUMENTS

| | | | |
|---|---|---|---|
| 7,127,250 | B2 | 10/2006 | Gallagher |
| 7,167,708 | B2 | 1/2007 | Backes |
| 7,254,372 | B2 | 8/2007 | Janusz |
| 7,283,492 | B2 | 10/2007 | Malladi |
| 7,308,263 | B2 | 12/2007 | Gallagher |
| 2002/0173271 | A1 | 11/2002 | Blair et al. |
| 2004/0022223 | A1 | 2/2004 | Billhartz |
| 2004/0054774 | A1 | 3/2004 | Barber et al. |
| 2004/0077355 | A1 | 4/2004 | Kermik |
| 2004/0077356 | A1 | 4/2004 | Kermik |
| 2004/0147223 | A1 | 7/2004 | Cho |
| 2004/0203461 | A1* | 10/2004 | Hay ................. 455/67.13 |
| 2004/0203474 | A1* | 10/2004 | Miller et al. ............ 455/69 |
| 2004/0203737 | A1 | 10/2004 | Myhre |
| 2004/0203800 | A1 | 10/2004 | Myhre |
| 2004/0203815 | A1 | 10/2004 | Shoemake et al. |
| 2004/0240525 | A1 | 12/2004 | Karabinis |
| 2005/0003827 | A1* | 1/2005 | Whelan ................ 455/454 |
| 2005/0021621 | A1 | 1/2005 | Welch |
| 2005/0111383 | A1 | 5/2005 | Grob |
| 2005/0143123 | A1 | 6/2005 | Black |
| 2005/0181823 | A1* | 8/2005 | Haartsen ............ 455/553.1 |
| 2005/0207395 | A1 | 9/2005 | Mohammed |
| 2006/0121853 | A1 | 6/2006 | Madhavan |
| 2006/0121854 | A1 | 6/2006 | Abhishek |
| 2006/0211012 | A1 | 9/2006 | Hoffmann |
| 2006/0217067 | A1* | 9/2006 | Helbig ................ 455/63.1 |

FOREIGN PATENT DOCUMENTS

| | | |
|---|---|---|
| EP | 1411685 | 4/2004 |

OTHER PUBLICATIONS

Office Action dated Mar. 7, 2007 cited in related Application No. 11/004,600 (Copy Attahced).

Office Action dated Aug. 23, 2007 cited in related Application No. 11/004,600 (Copy Attached).

Office Action dated Feb. 8, 2008 cited in related Application No. 11/004,600 (Copy Attached).

Office Action dated Feb. 5, 2008 cited in related Application No. 11/004,288 (Copy Attached).

* cited by examiner

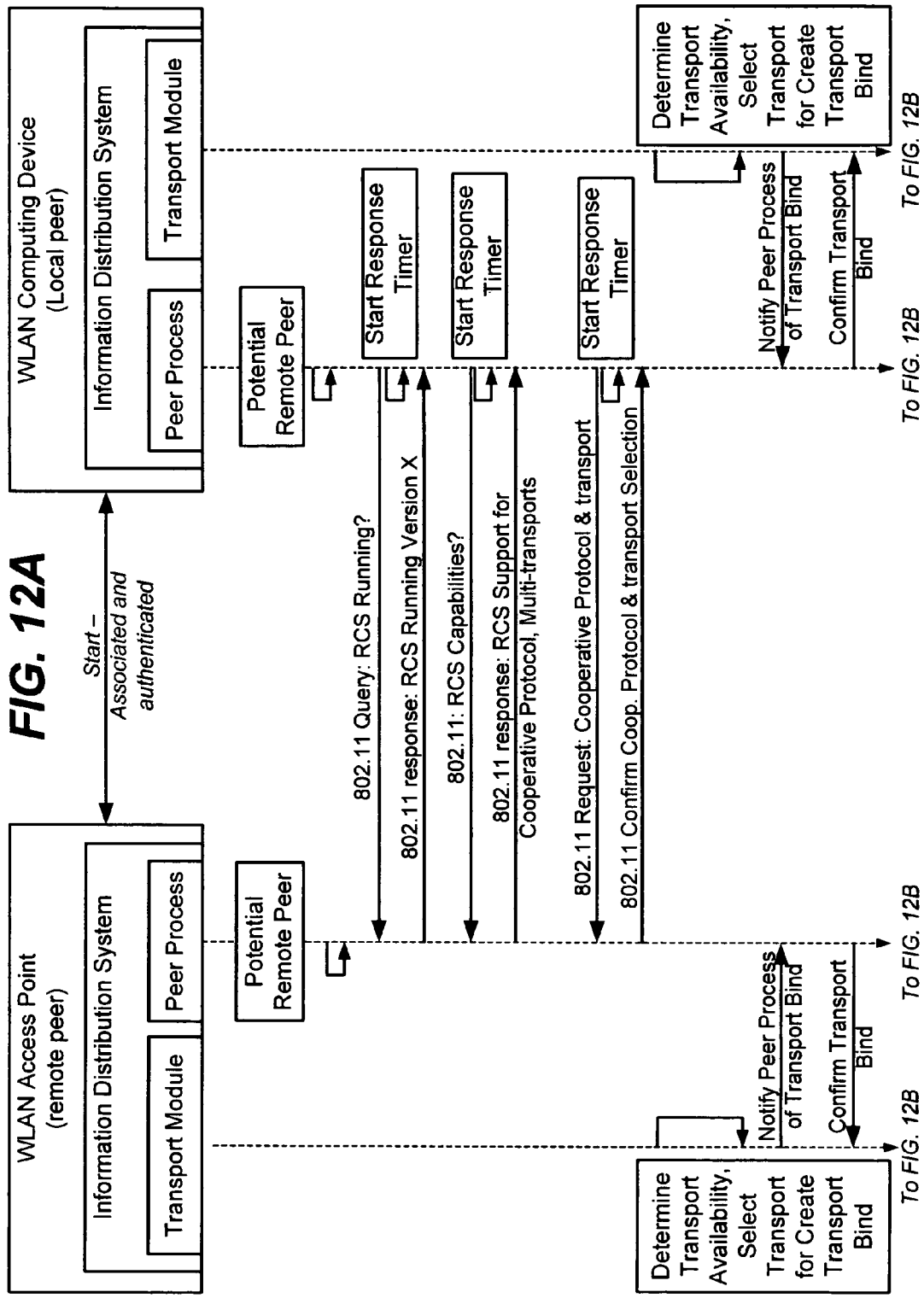

PROTOCOL FOR EXCHANGING CONTROL DATA TO MITIGATE INTERFERENCE PROBLEMS IN WIRELESS NETWORKING

CROSS-REFERENCE TO RELATED APPLICATIONS

The present invention is related to the following copending United States patent applications filed concurrently herewith, assigned to the assignee of the present invention, and hereby incorporated by reference in their entireties:
"Extensible Framework for Mitigating Interference Problems in Wireless Networking," U.S. patent application Ser. No. 11/004,600; and
"Use of Separate Control Channel to Mitigate Interference Problems in Wireless Networking," U.S. patent application Ser. No. 11/004,288.

FIELD OF THE INVENTION

The invention relates generally to computer systems, and more particularly to exchanging information in wireless networks.

BACKGROUND

Wireless local area networks (WLANs) are proliferating in both home and enterprises. Such wireless networks may be used for web browsing, file transferring, audiovisual streaming, sending and receiving messages, and other purposes. As wireless connectivity spreads, the likelihood of radio frequency (RF) activity from other bands and overlaying bands used in wireless networking bands increases for any given location, resulting in interference for a greater percentage of wireless network users.

Further, because wireless networks operate in unlicensed bands in the 2.4 GHz and 5 GHz regions of the RF spectrum, many other RF devices transmit information (or noise) on these frequencies as well, causing interference to the WLAN communication. Examples of various sources and types of interference seen by a home wireless network may include microwave ovens, which cause slow periodic interference; cordless phones, which cause interference of a type referred to as "slow hopper;" a Bluetooth headset (causing fast hopper interference); digital spread spectrum (DSS) cordless phones, which cause constant custom waveform interference; and wireless surveillance cameras, which cause constant standard waveform interference. In addition, other nearby WLANs operating on the same channel, such as that of a neighbor, can cause interference.

As is understood, RF interference in wireless networking results in an effective reduction of available data rates and/or range, causing poor user experience. While a technically-knowledgeable user may be able to mitigate a regularly occurring interference problem by reconfiguring networking devices to operate on another channel, many of the sources of interference transmit intermittently, whereby even if one problem was solved by changing to another channel, another problem might arise that occurs intermittently, which is more difficult to detect and resolve.

Essentially, a primary problem is that wireless network computing devices do not know what is going on with respect to RF interference in the wireless network and consequently cannot adapt to it. What is needed is a way to provide for a reasonably good wireless experience, including in the presence of RF interference, by providing information about the RF interference to the computing devices so that interference problems can be mitigated.

SUMMARY OF THE INVENTION

Briefly, the present invention is directed towards a protocol comprising a system, method and data structures, by which network communication devices (peer nodes such as a computer system and an access point) can exchange information about RF interference detected in the network. The protocol, referred to as the cooperative protocol, administers the exchange of formatted control data corresponding to the detected interference. The control data is exchanged among computing nodes in the network that are running a service capable of processing such control data, referred to as a robust coexistence service.

The robust coexistence service (RCS) comprises a flexible and extensible framework including a local processing subsystem that allows spectrum sensor hardware to be plugged in so as to output data corresponding to sensed RF conditions, including any interference. One or more software classifiers and application programs are also plugged in to the framework and operate to assess the sensed RF data, in order to provide interference-related information for informational purposes as well as for mitigating any interference-related communication problems.

In one implementation, the cooperative protocol provides the framework and structure that is used for peer discovery, peer information exchange, and the transport mechanism used to deliver the protocol. According to the cooperative protocol, the locally-detected interference-related information is formatted, along with general environment information and the like, into control data, which is then distributed from the local node to a remote peer node in the wireless network that is RCS-enabled (running the robust coexistence service), whereby the remote node knows the local node's current RF environment. A similar exchange of control data occurs in the opposite direction. As a result, the peer nodes know each other's environments, and when any node transmits the main (non-control) data to a receiver node, the transmission can be adapted to avoid the interference, or mitigate the effect of the interference in some way. For example, if an access point knows that a device to which it is associated is experiencing interference on one channel, the access point and device can agree to switch to a different channel. Note that with an access point, each associated computing device has only the access point as its peer, while the access point has a peer relationship with each associated access point. In an ad hoc network, devices may have multiple peers.

To distribute the control data, each robust coexistence service also includes an information distribution subsystem. The information distribution subsystem includes a transport module that communicates the control data including any interference information locally-sensed at the computer system to another, remote node on the network, and receives similar information sensed remotely at that node.

To support the cooperative protocol, the information distribution service further includes a peer process that manages a peer table containing the local and remote interference-related control data, and performs tasks including peer discovery and peer feedback handling. Peer feedback may be used to leverage the interference-related information sensed at a remote RF environment for use in local mitigation.

Using the cooperative protocol, (local and remote) peers thus provide radio interference and spectrum details about their immediate surroundings, and notify a remote peer of localized interference. The interference and frequency information collected through the cooperative protocol may then be used by peer devices in the network to adapt to mitigate the interference-related problems.

To accomplish peer discovery, once an RCS-enabled system has an association with a WLAN access point, the system begins looking for other RCS-enabled systems using a discovery message exchange. During this exchange, a version or the like of the cooperative protocol is agreed upon, along with the transport for the exchange of the protocol data. The chosen transport (which may be on a different channel from the main data channel) may be an IP or link layer. The transport negotiation allows an older system to communicate the control data on a channel that it is equipped to use.

Following the discovery and setup phase, the two peer devices reach a steady state for RF spectrum and interference information exchange. In one implementation, the exchanged control data may contain one to three levels of information, including general, (non-interference related) information about the device's environment (Level 1), coarse information about the main data channel, including general data indicative of whether any interference is present (Level 2), and specific interference-related information (Level 3) such as the type of interferer, frequency, duty cycle, periodicity of the interference and so forth. Extended information may also be communicated.

In general, each peer maintains its own control data within a record in its peer table, along with information received from another peer device in another record, or in the case of an access point or in an ad hoc network where there are multiple peers, in subsequent records. The local record is updated as interference changes are detected, while the peer record is updated as data is exchanged with a peer device.

The peer devices remain connected through the cooperative protocol until one (or both) initiates a disconnect. The protocol also supports a keep-alive heartbeat mechanism whereby for an operational device updates to the peer table may be made, while for a non-operational device, the corresponding record may be removed from the peer table.

Other advantages will become apparent from the following detailed description when taken in conjunction with the drawings, in which:

BRIEF DESCRIPTION OF THE DRAWINGS

FIGS. 12A and 12B comprise a representation of an example ordering of remote peer discovery operations according to the cooperative protocol, in accordance with various aspects of the present invention.

DETAILED DESCRIPTION

Exemplary Operating Environment

Figure 1:
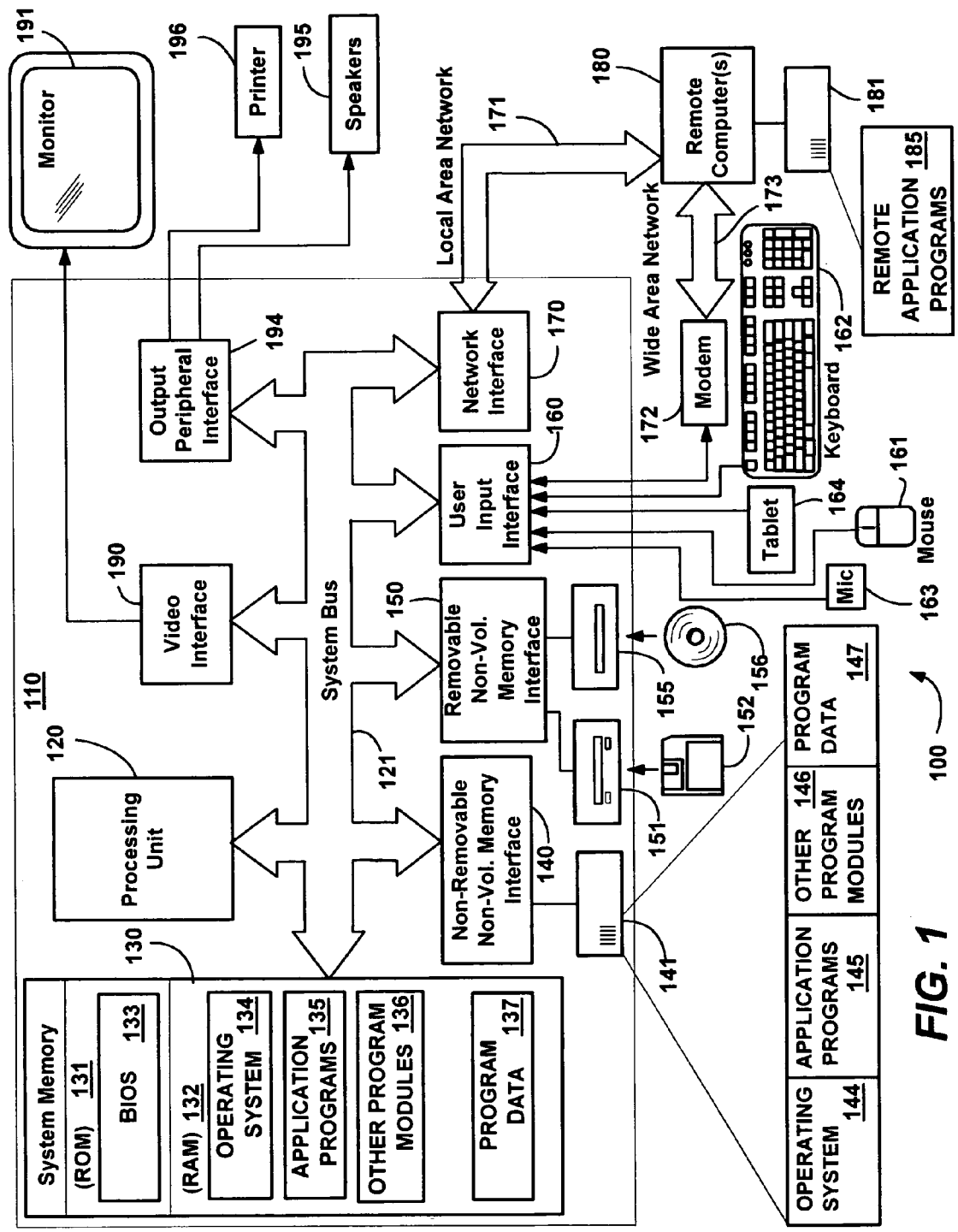
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Robust Coexistence Service

The present invention is generally directed towards a protocol by which data related to interference detected in the portion of the RF spectrum that is used for wireless network communications may be communicated to a peer node in the network, primarily for purposes of avoiding the interference at least mitigating its effects on wireless network communications. As will be understood, numerous ways to implement the present invention are feasible, and only some of the alternatives are described herein. For example, the present invention is primarily described below with reference to a framework into which RF-related sensors, classifiers and application programs plug in to dynamically sense the spectrum and process the sensed data to mitigate the effects of interference on network communications. However, as can be readily appreciated, such a framework is not required to use the protocol, and indeed, a sensor coupled to any software program (or even other properly-configured hardware) would be able to use the protocol to exchange the interference-related information that is sensed. For example, the framework may be run on a computer system, but alternatively may be adopted by hardware manufacturers for integration into an access point device, wireless bridge, and so forth. Further, as will be understood, the protocol may be rearranged, as the order is not important, and not all of the information exchanged according to the protocol is necessary for mitigating interference-related problems. As such, the present invention is not limited to the example architecture or any of the particular examples used herein, but rather may be used various ways that provide benefits and advantages in computing in general.

Figure 2:
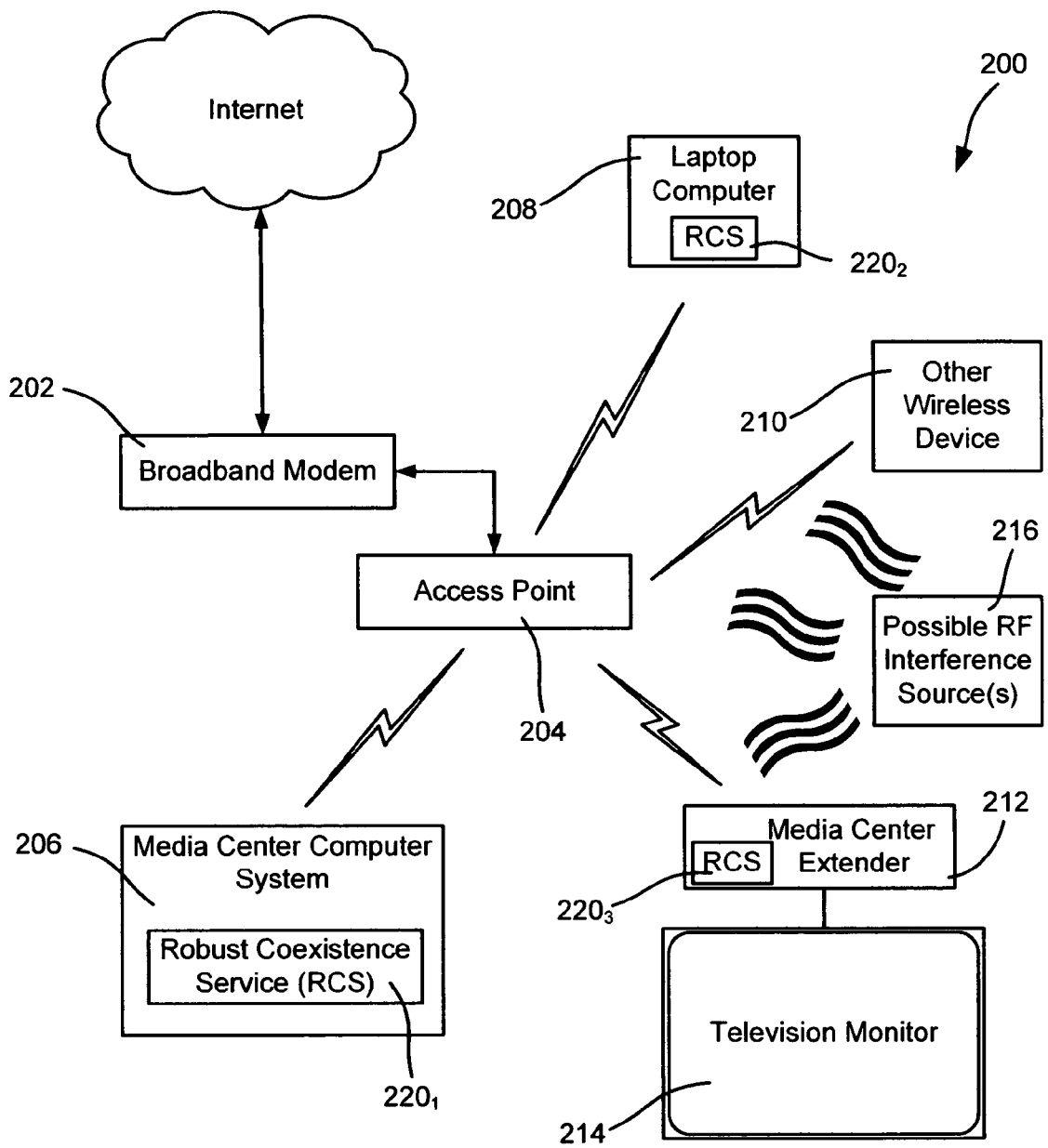
FIG. 2 is a block diagram generally representing an example wireless network including components running instances of the robust coexistence service, in accordance with various aspects of the present invention.

Turning to FIG. 2 of the drawings, there is shown an example wireless network 200 containing wireless devices such as may be found in a home networking environment, but may, of course be used in other environments, and also may be connected to a wired network device or devices. In the example network 200 of FIG. 2, a broadband modem 202 such as a cable modem or DSL modem receives and sends Internet data within the network 200. A wireless access point (wireless router) 204, ordinarily connected by a wired connection (directly or indirectly) to the broadband modem 202, couples the other wireless devices to the broadband router 202 and to one another.

The other wireless devices represented in FIG. 2 include a media computer system 206, a laptop computer 208, some other wireless device 210 such as a different laptop or desktop computer, and a media center extender 212 (similar to a set-top box) that couples audiovisual signals to a television monitor 214. Note that an alternative media center extender may be directly incorporated into the television monitor. FIG. 2 also shows a representation of one or more possible sources of RF interference 216, which may be essentially anything that generates RF transmissions that can cause interference with wireless network communications, whether intentionally operating in the same frequency range, such as with a cordless telephone, or because of noise that results as a side-effect of operating, such as with a microwave oven.

By way of example, consider that the media center 206 streams audiovisual content via the access point 204 to the media center extender 212. While the audiovisual data is being streamed, various non-networking RF sources 216 such as a cordless phone may interfere with the audiovisual stream. As can be readily appreciated, the stream may be interrupted or the bandwidth constrained to such an extent that the media center extender 212 exhausts any buffered data, whereby the user experience is that of a frozen, erratic or otherwise incorrect picture and/or sound. Occasional use of the interfering device, such as is typical with telephone usage patterns, is generally unpredictable and can be even more frustrating to the user.

Some of the wireless devices depicted in FIG. 2 include an instance of the robust coexistence service (RCS), shown in FIG. 2 as RCS instances $220_1$-$220_3$. As described below, the robust coexistence service along with a cooperative protocol provides a mechanism and framework by which interference-related information may be exchanged between peer devices (nodes) in the network, whereby the negative effects of RF interference on wireless networking may be dynamically mitigated to an extent, or possibly even eliminated, to thereby provide an improved user networking experience.

Figure 3:
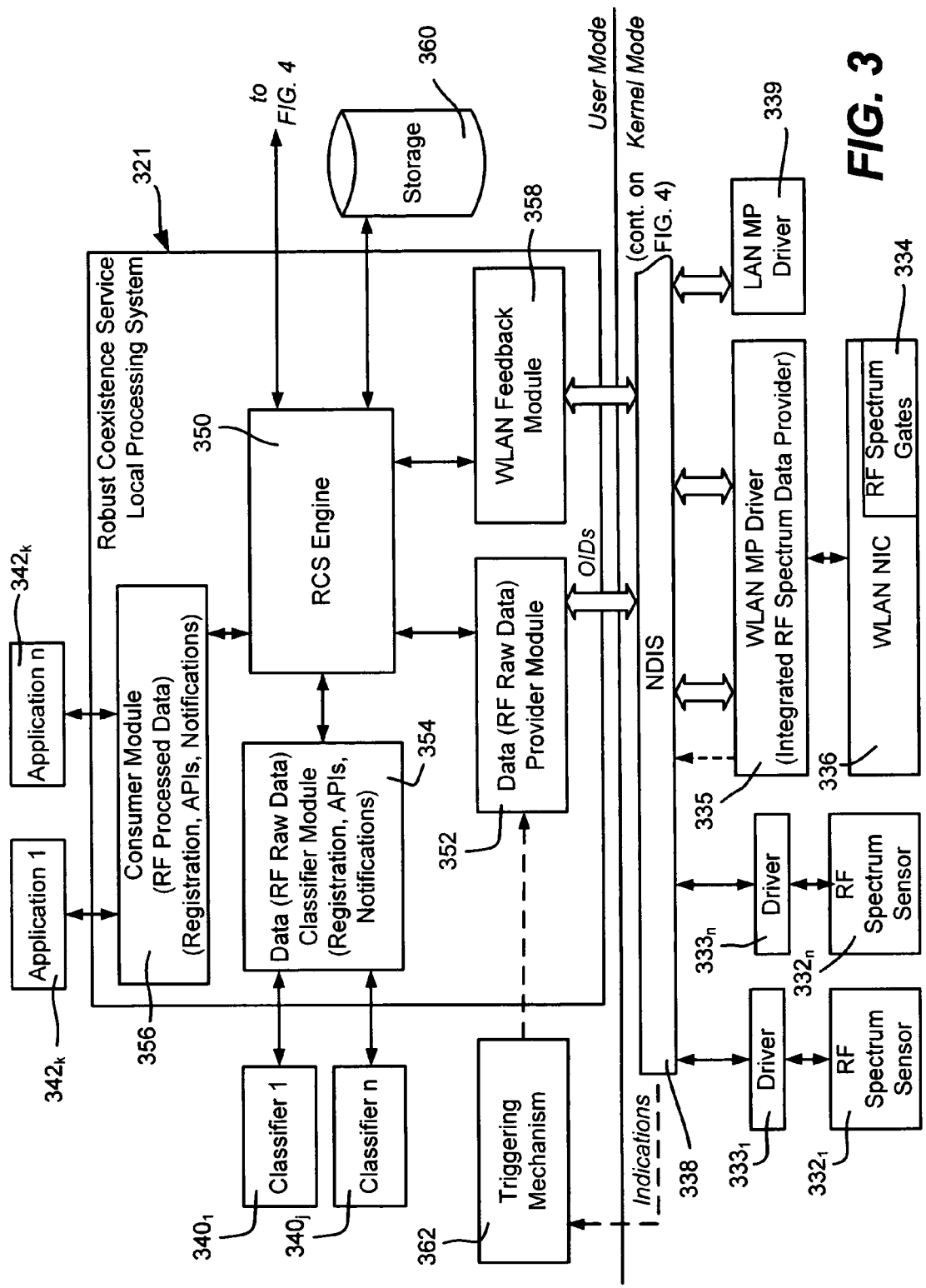
FIG. 3 is a block diagram generally representing components connected to local processing system components of the robust coexistence service, in accordance with various aspects of the present invention.

FIG. 3 shows one component subsystem of a robust coexistence service, referred to as a local processing system 321, along with the local processing system's internal modules and various other modules and resources to which it connects. In general, and as described below, the RCS local processing system 321 interconnects and coordinates the operations of the various external modules that are plugged into the robust coexistence service running on a network node, such as a computer system or an access point, in order to develop mitigation data that may be used to dynamically control the wireless networking components in a way that mitigates the problems caused by interference. To this end, the RCS local processing system 321 interconnects external modules that process spectrum data sensed by local spectrum hardware, e.g., stand-alone hardware and/or hardware integrated into a WLAN chipset, and makes the processed information available for mitigation purposes. Another part of the robust coexistence service, referred to as an RCS information distribution system 421 and described with reference to FIG. 4, coordinates the communication of the control information to other remote devices that are running respective instances of the robust coexistence service, along with handling control information sensed at, processed and received from those remote devices. In keeping with the present invention as described below, the RCS information distribution system 421 implements a protocol to provide locally-obtained control data for use by any other peer remote robust coexistence service for interference mitigation purposes on its corresponding remote node, and obtains remotely-sensed control data for use by the local node for interference-related mitigation.

As represented in FIG. 3, in general, the RF sensing spectrum hardware provides sensed raw RF data to the local processing system 321. More particularly, the spectrum sensing hardware comprises one or more standalone spectrum chips (gates) $332_1$-$332_n$, and/or RF spectrum gates 334 embedded in the WLAN network interface card (NIC) 336 (or similar built-in circuitry), and coupled to an appropriate antenna or the like. As represented in FIG. 3, the spectrum hardware communicates the data via a respective corresponding driver $333_1$-$333_n$, and/or 335 to the local processing system 321, such as through the kernel mode NDIS (Network Driver Interface Specification) interface layer 338 or directly as a spectrum device kernel mode driver, which provides an interface to the user-mode RCS local processing system 321. Note that the robust coexistence service can also be implemented in kernel and also support kernel mode classifiers and kernel mode consumers. For completeness, FIG. 3 also shows a LAN miniport (MP) driver 339 for wired network connections. Note that also for completeness, FIG. 3 shows multiple sensors, e.g., the standalone sensors $332_1$-$332_n$ and their respective drivers $333_1$-$333_n$, along with the RF spectrum gates 334 and corresponding WLAN miniport driver 335 which includes an integrated RF spectrum data provider for handling the RF data; however it can be readily appreciated that more than one RF spectrum sensor is not needed in order to mitigate interference problems. Indeed, as will become apparent, no local sensor is needed on a given system if remotely-sensed RF control data is available to allow mitigation.

The RCS local processing system 321 provides interfaces to internal modules by which external modules, including classifiers $340_1$-$340_j$ and applications $342_1$-$342_k$, may register with the robust coexistence service 321. Note that the miniport drivers $333_1$-$333_n$ may be similarly pluggable through user mode software modules, and need not necessarily go through the NDIS layer 338. As part of registration, the various registering modules identify one or more various types of data that each supports, including data in a predefined, generic format understood by any classifier module, and/or data in a proprietary format (treated as blobs when routed to the corresponding classifier). The ability to use a proprietary format allows customized RF sensors and classifiers to be used in the framework. Data types may be a combination of predefined generic data and proprietary data type. A mapping is obtained (e.g., in the RCS engine 350) to relate the provider, classifier, consumer and driver in order to identify how a current set of information is to be processed. Identifiers may be used in routing custom data to the correct classifier, as can an evaluation as to whether at least part of the raw data is in the predefined format, in which event any classifier can consume at least part of the raw data. Alternatively, classifiers may receive and discard data they do not understand.

Within the RCS local processing system 321, an RCS engine 350 provides connectivity among its internal modules 352-358, generally routing data as appropriate, as described below. In general, the RCS engine 350 coordinates the activities of the various modules in the service, and also stores classifier data for future use, e.g., in a storage 360. For example, the storage 360 may preserve time-stamped interference classifier information events that may be used for historical analysis.

Via the layered mechanism described above, a data provider module 352 of the system 321 obtains the raw data sensed by the spectrum sensing hardware $332_1$-$332_n$, and/or 334, along with any raw RF data and other lower MAC (media access controller) and PHY (physical) layer device data. From there, the data provider module 352 transfers the raw data to the RCS engine 350 to be forwarded to an appropriate classifier or classifiers (e.g., based on the respective data type or types for which they have registered) for processing into classified data. In one implementation, the data provider module 352 and the drivers may use identifiers (e.g., OIDs or APIs) to pass the raw RF data for consumption by a corresponding classifier or classifiers. As can be readily appreciated, the use of a driver model provides extensibility, as various spectrum sensors may be connected via a corresponding driver, including new ones as developed.

Note that the local processing system 321 may remain idle until needed, that is, until some RF interference is sensed. To awaken the local processing system 321 at the correct time, a triggering mechanism 362 may be used, comprising one or more components that monitor the NDIS layer 338 and provide indications of interference. Further, note that the triggering mechanism 362 may not awaken the local processing system 321 to initiate interference processing until some threshold level of interference is achieved.

To route the RF data to an appropriate classifier, the RCS engine 350 forwards the raw data to a data classifier module 354 of the local processing system 321. In general, the classifier module 354 communicates with the registered classifier or classifiers $340_1$-$340_j$, to provide the raw spectrum data thereto and return processed data, referred to as classified data, for further processing. Note that this also provides for extensibility, as new and/or improved classifiers can simply plug-in as they become available.

In turn, the external classifiers $340_1$-$340_j$, which comprise one or more pluggable modules, essentially look at the raw RF data to determine what is happening in the RF environment. To this end, the classifiers $340_1$-$340_j$ process the raw RF data to perform signature analysis and the like, possibly combining the RF data with other network traffic measurements, to identify the data's relevant characteristics and possibly the source of interference (e.g., cordless phone, microwave oven, Bluetooth device and so forth), and supply such classified data for further action.

A consumer module 356 of the local processing system 321 takes the classified data and (via the RCS engine 350) may store it in the storage 360 and/or route the classified data to registered application programs $342_1$-$342_k$, such as for enunciation of the detected interference as well as for higher-level processing to determine how to adapt the program to avoid the interference. To this end, one or more application programs register with the local processing system 321 to use the classified data to take some action, such as to provide a viewable notification or other indication regarding interference (e.g., a diagnostic application may prompt the user about an RF issue, such as "Cordless phone in use"), and/or, to determine a way to mitigate interference-related communication problems to some extent. For example, the classified data can be used by application programs such as an audio/video streaming application program to reduce the image size of an ongoing transmission, thereby transmitting a lesser amount of A/V streaming data. To this end, the application program may use the classified data as a hint for the application program to conduct its own tests to decide a due course of action in adjusting its behavior.

Note that one application program such as a diagnostic program may handle notifications, and another program may devise its own mitigation solution based on the classified data and any test results. Again, because of the plug-in model for application programs, the framework's extensibility characteristics are readily apparent.

In turn, interference mitigation-related information determined by the robust coexistence service may be passed (e.g., via the RCS engine 350) to a feedback module 358, from where it is communicated to the WLAN miniport driver 335 (or the WLAN NIC 336) for performing dynamic upper-MAC and other adaptations that provide an interference mitigation solution. By way of example, the WLAN miniport driver 335 (or the WLAN NIC 336) can determine from the classified data and internal WLAN data that interference-related problems may be mitigated by changing the frequency to another channel, changing the rate at which data is sent, changing the timing of sending data (such as to avoid interference that starts and stops in a predictable pattern), and in other ways, including combinations of channel, rate and/or timing solutions, switching to another band, staying on the same channel while employing transmission dodging, employing fragmentation to reduce packet size (smaller packets have lower collision chances compared to larger packets and in case of a collision, the cost of retransmission is less due to smaller size of retransmission), and so forth.

Figure 4:
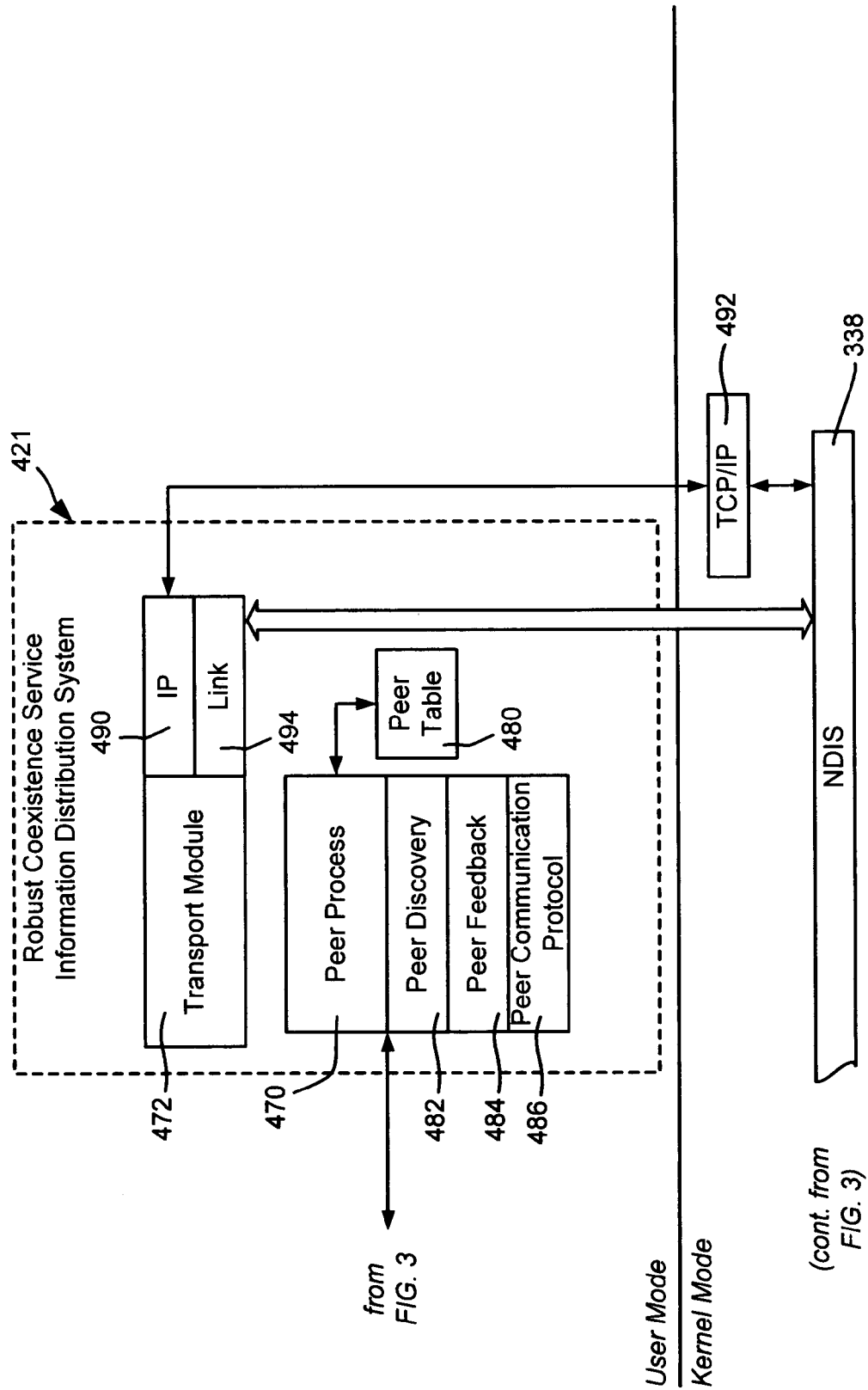
FIG. 4 is a block diagram generally representing components connected to information distribution system components of the robust coexistence service, in accordance with various aspects of the present invention.

Turning to FIG. 4, as mentioned above, another subsystem component of the robust coexistence service comprises an information distribution service 421 that communicates interference information sensed at the local computer system to other remote devices on the network, and receives similar information sensed remotely, for use in locally mitigating interference. As represented in FIG. 4, the information distribution service 421 includes a peer process 470 and a transport module 472.

In accordance with an aspect of the present invention, the peer process manages a peer table 480 and performs tasks including peer discovery 482, peer feedback 484 and also manages peer communication via a communication protocol 486, referred to as a cooperative protocol, and described below. In general, peer discovery 482 may use Plug-and-Play (uPnP) technology to discover the wireless nodes that participate in the robust coexistence service, such as handling current audiovisual streams.

Peer feedback 484 is used to communicate the RF environment and other characteristics of each node using the cooperative protocol, with updates at appropriate times such as upon interference detection and/or at selected intervals. The cooperative communication protocol 486 defines the method, format and the type of RF environment and other characteristics of each node that are to be distributed among the nodes.

The transport module 472 distributes corresponding protocol packets. One way to transport the packets is to use the IP 490 and the TCP/IP 492 layers, via wired or wireless LANs. Another way is to use a link layer via WLAN or another wireless technology using the same or another wireless band. In this mechanism, packets can be sent on the same channel as the data, or as described in the aforementioned related U.S. patent application entitled, "Use of Separate Control Channel to Mitigate Interference Problems in Wireless Networking," a different channel may be used, in the unlicensed band or even a channel in the licensed band. Note that as described therein, a benefit of using a separate channel for exchanging the control information is that the channel in use for regular data communication may be unable to exchange such control information at times of interference, and thus the control data is also not available for use in mitigation.

Figure 5:
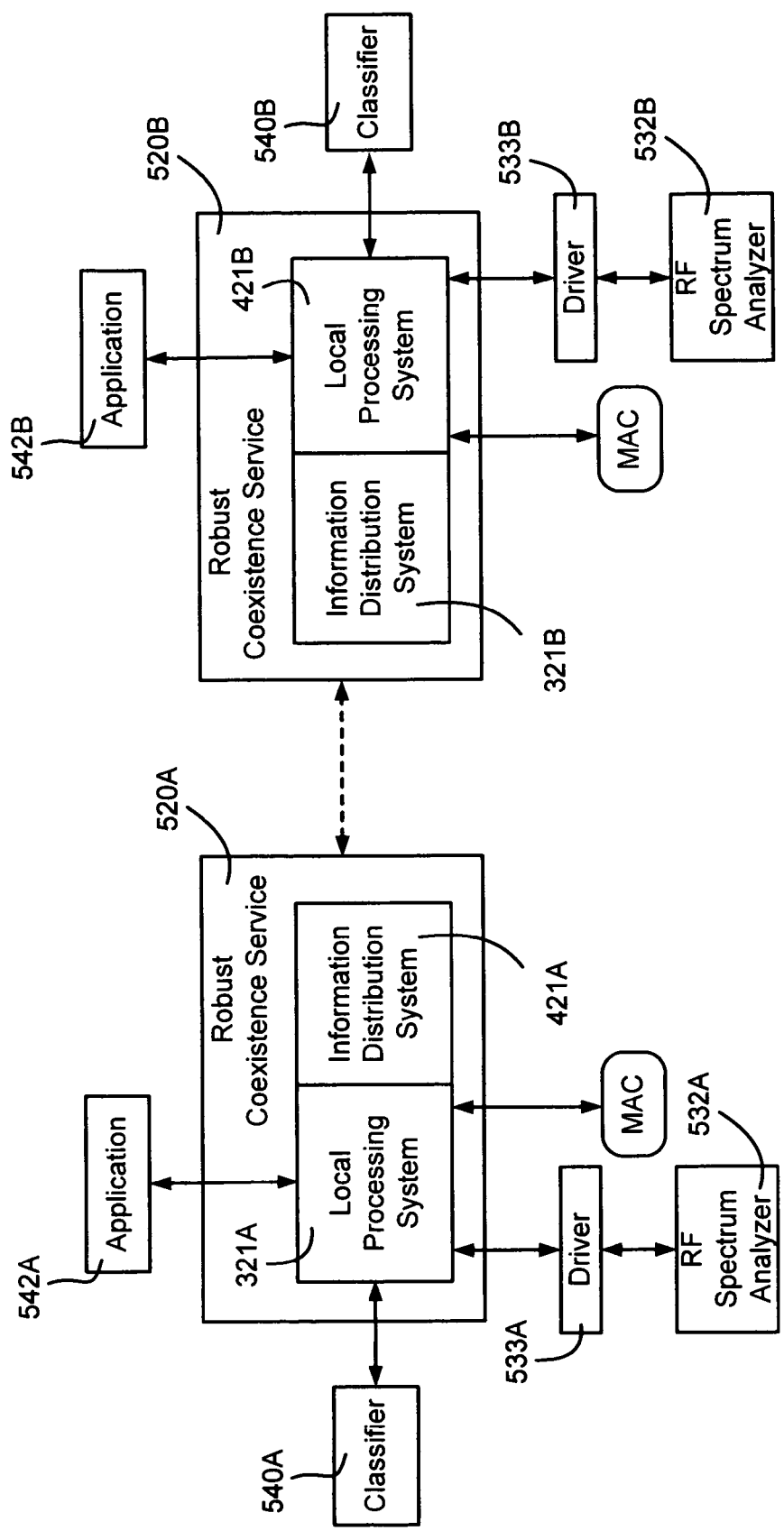
FIG. 5 is a block diagram generally representing two instances of the robust coexistence service communicating sets of RF-related information with one another, in accordance with various aspects of the present invention.

As represented in FIG. 5, in a distributed wireless network with multiple wireless nodes, each node can have one or more spectrum chips 532A and 532B, and a respective instance of an associated robust coexistence service 520A and 520B. Each node may thus aggregate classifier information using its respective information distribution system 421A, 421B, treating other nodes as remote peers.

Another aspect is local peers, enabling collective processing by RCS-enabled wireless nodes, which is based on another robust coexistence-like service running on the same wireless node. This is alternatively represented in FIG. 5, if instead of being considered separate nodes, the services are considered as peers connected and running on the same node. For example, in an environment having more than one spectrum chip in which a per-chip robust coexistence-like service) is being run on the same node, the robust coexistence services 520A and 520B may communicate via their respective information distribution sub-systems 421A and 422B, where they are peers to each other, but local peers, not remote peers.

Figure 6:
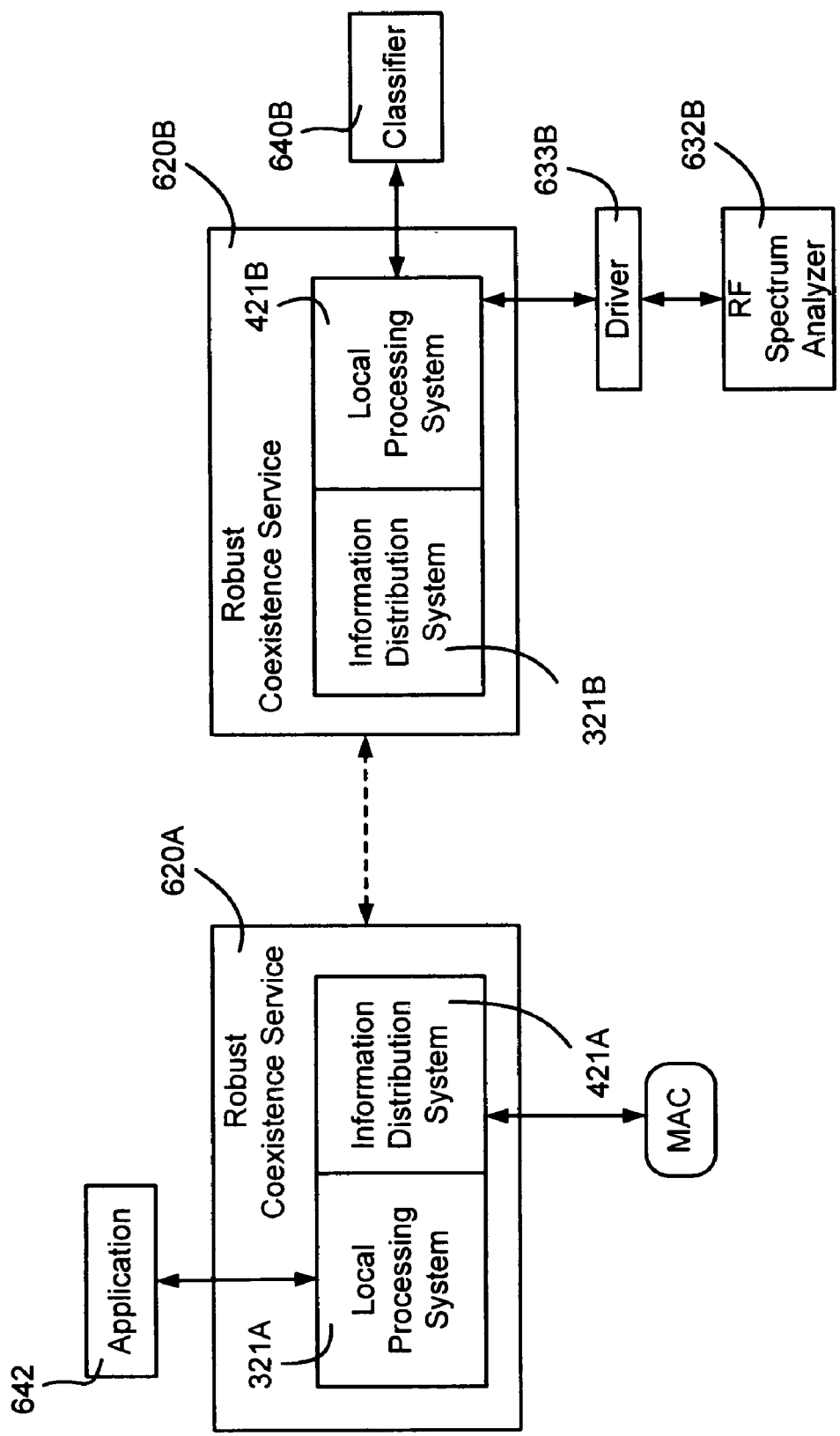
FIG. 6 is a block diagram generally representing two separated instances of the robust coexistence service, where only one of the services has a set of sensed RF-related information, and communicates it to the other service, in accordance with various aspects of the present invention.

Moreover, combining robust coexistence-like services on the same node provides the option of obtaining one fully functional set of components, even if, for example, each robust coexistence service does not have a full set of components that would make it fully functional by itself. Thus, FIG. 6 shows that the application program 642 interfaced to the robust coexistence-like service 620A, along with the MAC connected thereto, complement the classifier 640B, driver 633B and RF spectrum analyzer 632B connected to the robust coexistence service 620B to provide full functionality.

Figure 7:
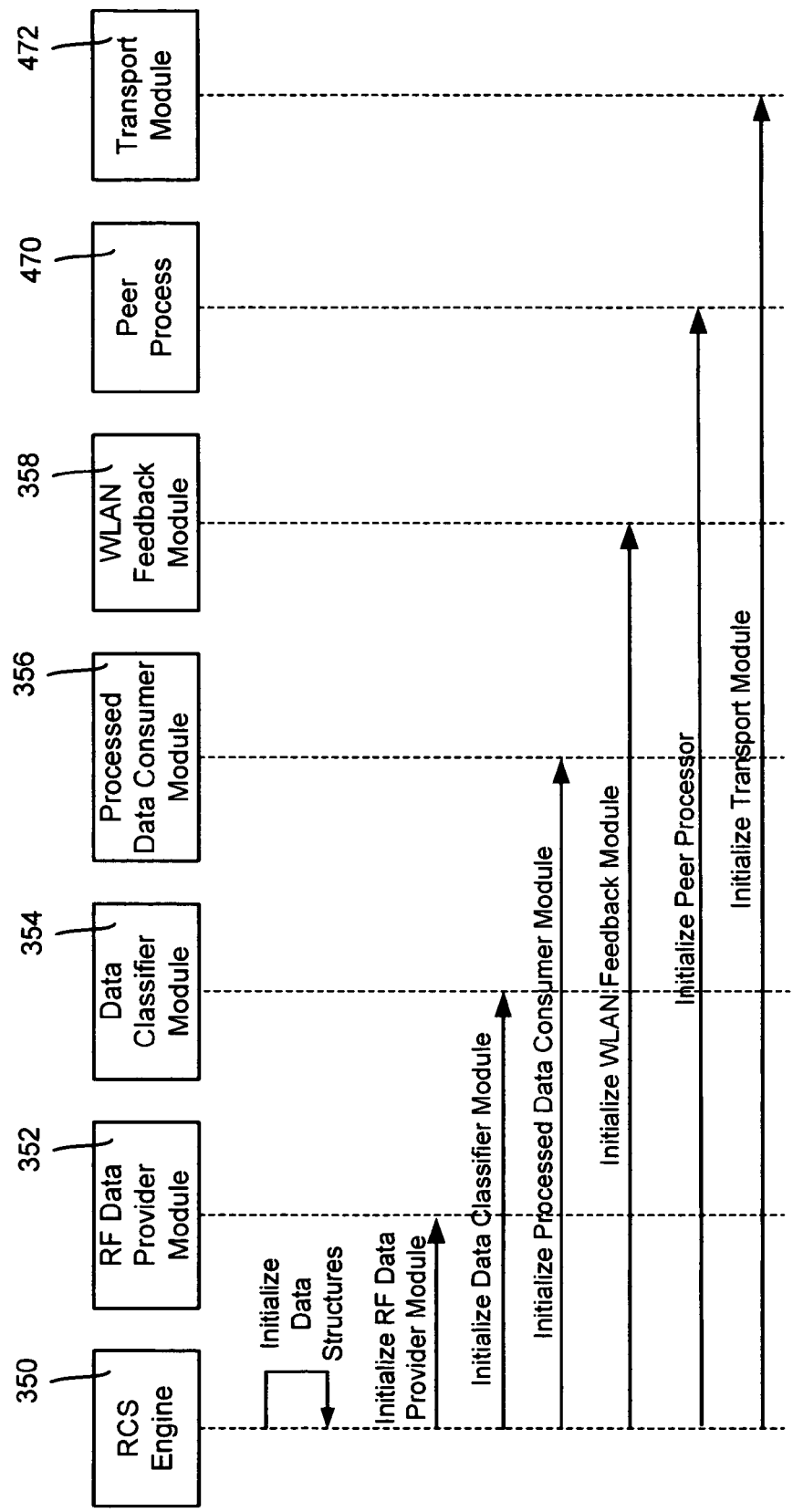
FIGS. 7-10 comprise representations of an example ordering of various robust coexistence service operations, in accordance with various aspects of the present invention.

Turning to an explanation of the basic operation of the robust coexistence service 320, FIG. 7 represents an example over time (not to any scale) that shows the initialization of the various internal modules of the robust coexistence service 320. As can be appreciated, the ordering is not important unless information is needed from one module's initialization to startup and/or completely initialize another. Thus, FIG. 7 represents the robust coexistence service 320 starting the RCS engine 350, and initializing the various other modules, e.g., the RF data provider module 352, the data classifier module 354, the data consumer module 356 and the WLAN feedback module 358. Also, in keeping with the present invention, the peer process 470 and transport module 472 are initialized.

Figure 8:
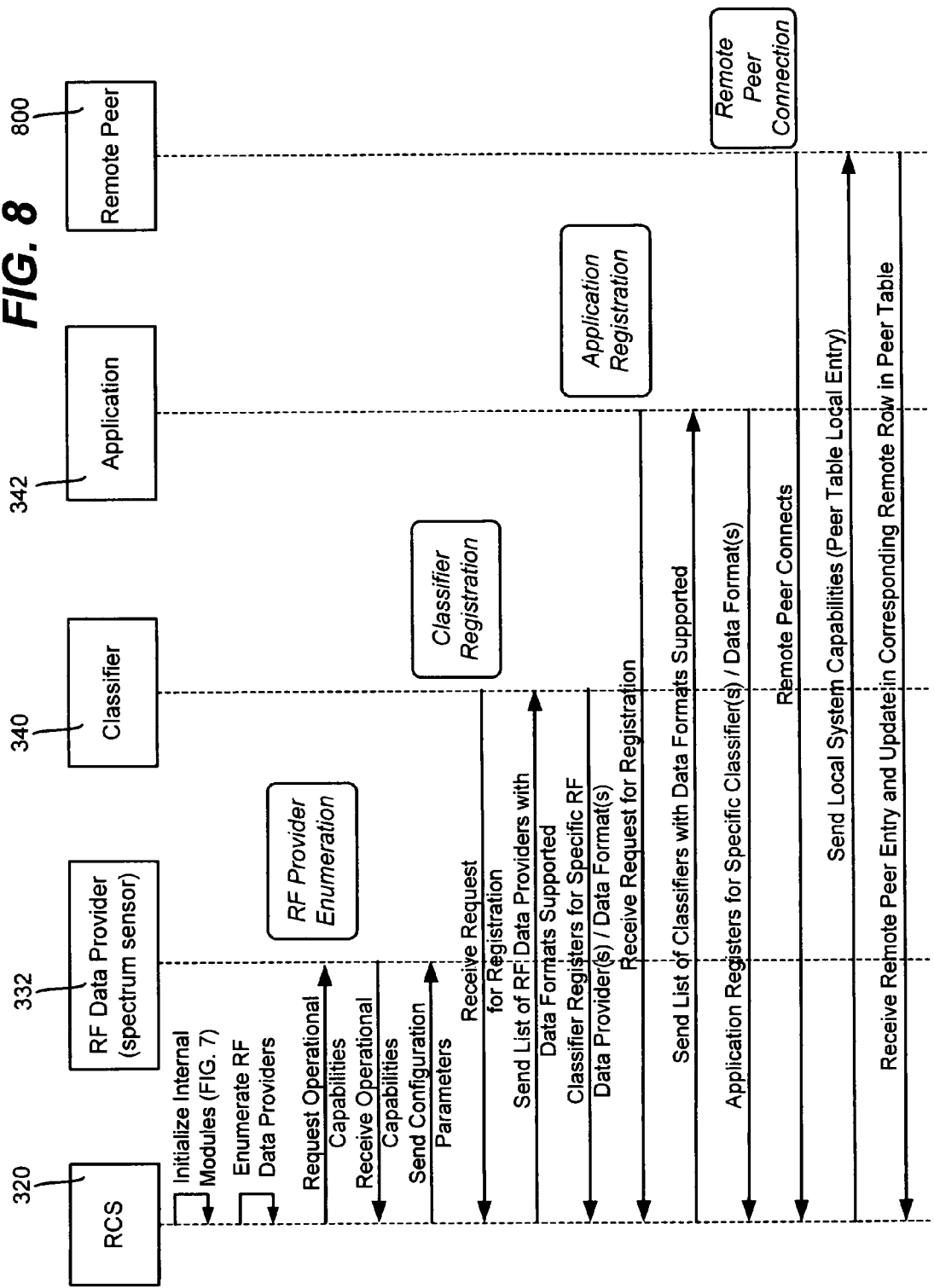

FIG. 8 shows, following internal initialization, the enumeration and registration with an RF spectrum sensor (RF data provider) 332 via its respective driver. The robust coexistence service 320 may select and set the operating parameters of the RF data provider 332, (e.g., bandwidth to detect, channel detection sequence, detection interval and so forth).

As also represented in FIG. 8, the robust coexistence service 320 registers each requesting classifier (e.g., 340), and provides it with a list of the RF spectrum sensors/data providers that were enumerated. In response the data classifier module receives a specific registration request for one or more RF data providers on the list. Application registration and connection to a remote peer 800 are also represented in FIG. 8.

Figure 9:
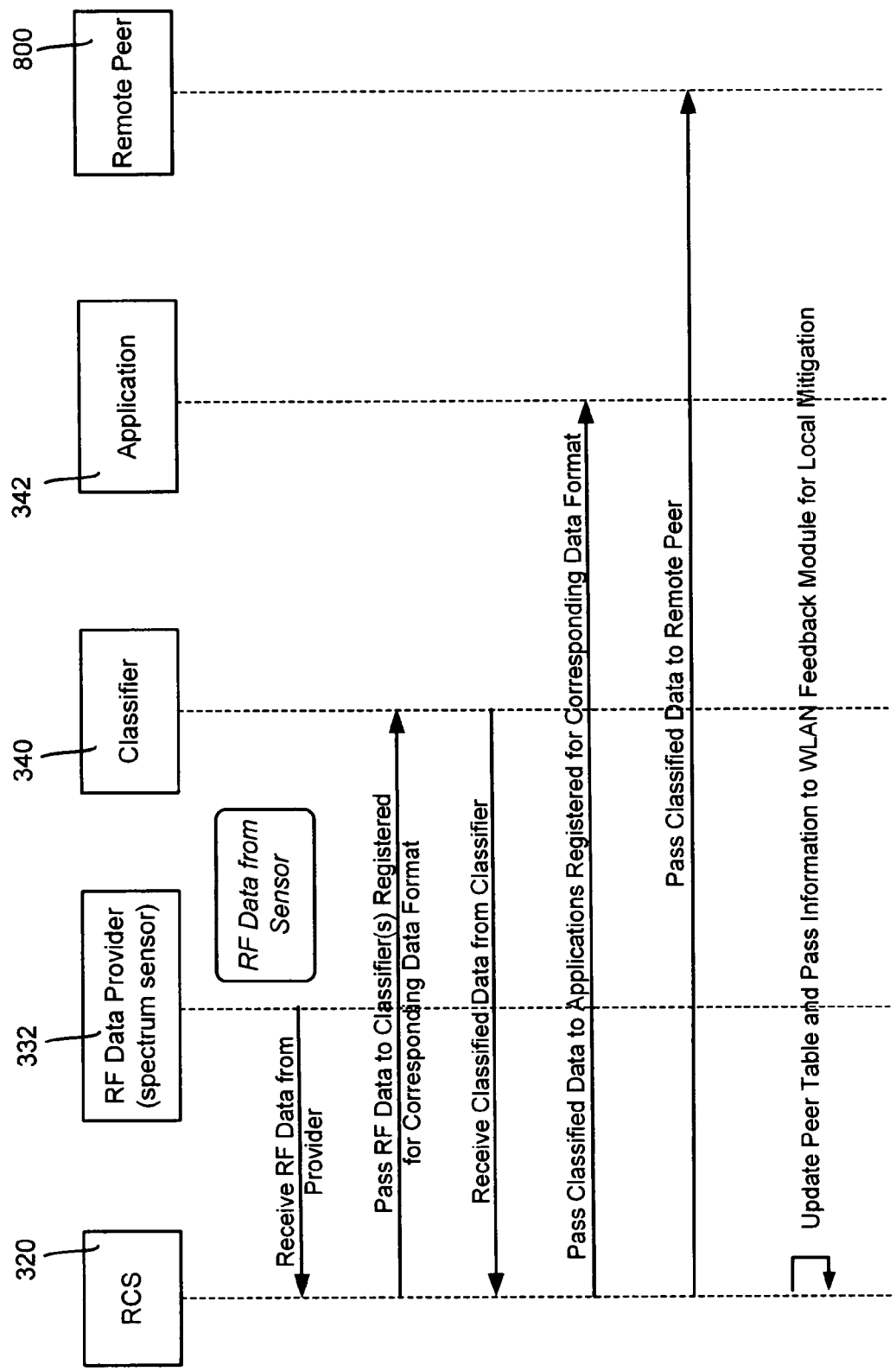

FIG. 9 reiterates the operations when data is received from an RF sensor 332. As described above, the data is provided to an appropriately-registered classifier (e.g., 340), with classified data returned and then forwarded to an appropriately-registered application program 342. Corresponding control data may be passed to any remote peers such as the remote peer 800, and the local peer table updated with local control data based on the classified data in accordance with the cooperative protocol of the present invention. Mitigation information (e.g., as calculated by the robust coexistence service 321 based on the classified data, or the classified data itself) is then sent to the feedback module for use in adjusting the networking parameters to mitigate the interference problem, as described above.

Figure 10:
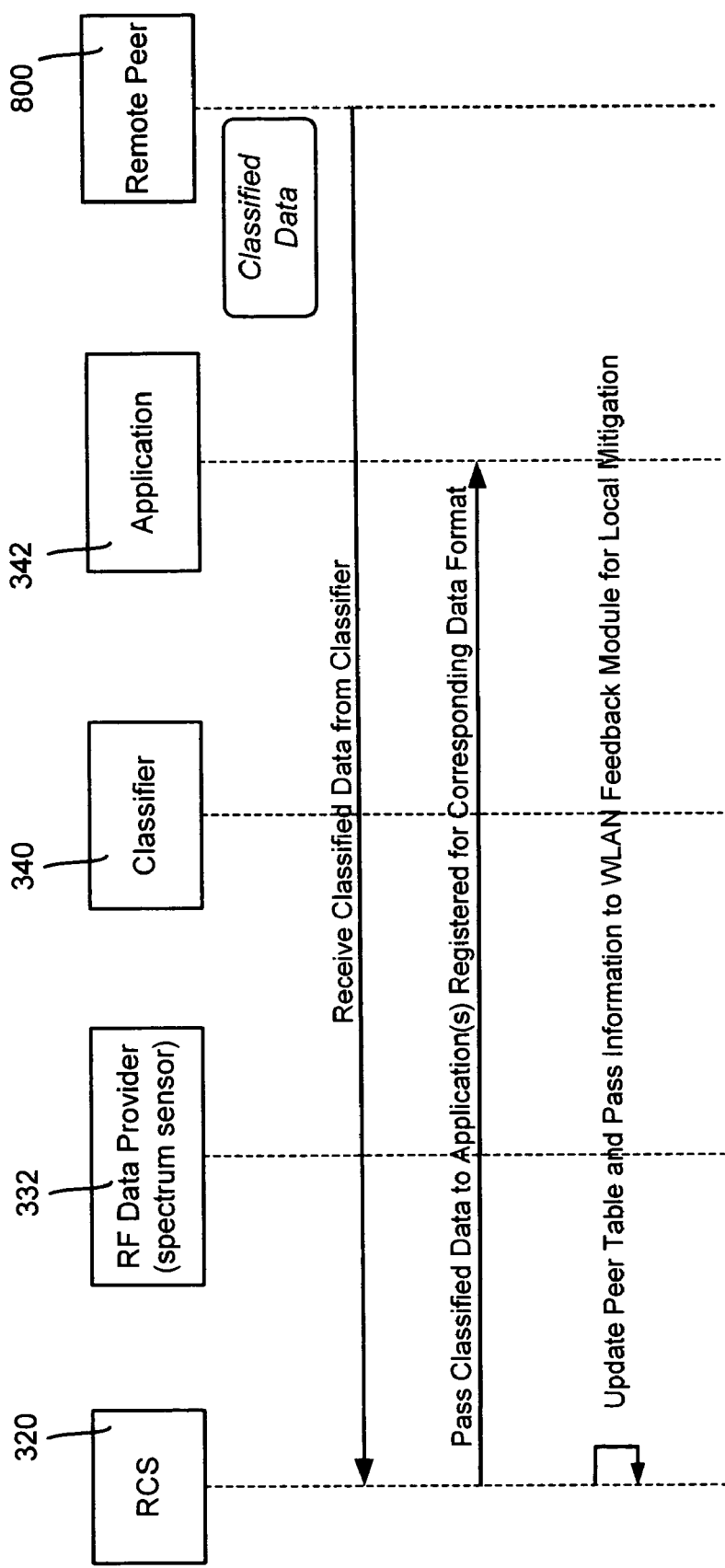

FIG. 10 shows the operations when classified data, such as formatted as control data according to the cooperative protocol, is received from a remote peer 800. As represented in FIG. 10, this remotely-obtained classified data is passed to the appropriate application program 342 or WLAN miniport Driver 335 (or WLAN NIC 336), which uses the processed data to dynamically adjust the networking parameters to mitigate the interference problem. In keeping with the present invention, the peer table is also updated.

The Cooperative Protocol

In accordance with various aspects of the present invention, the cooperative protocol is provided for information exchange among each RCS-enabled system, including control data containing interference information, whereby an improved wireless experience may result. The cooperative protocol may be run over home networks, enterprise networks and in other computing environments, and is extensible. In general, the cooperative protocol administers the exchange of control data among RCS-enabled system nodes, which may be thought of as administering the control plane between the nodes. As mentioned above, the protocol provides structure/ mechanisms for peer discovery, peer information exchange, and for binding a transport mechanism used to deliver the protocol.

As described above, the robust coexistence service collects the RF interference information, and in conjunction with the cooperative protocol, and in a typical wireless network having an access point, exchanges corresponding control data within the basic service set (BSS). The control data may be used to signal other modules and applications, so that interference mitigation action can be offered and taken at each local recipient system. The path for exchanging the cooperative protocol's control data can be assigned to either the current RF channel, a separate RF channel in the current spectral band, a completely separate channel in another unlicensed band (e.g. moving from 802.11g in 2.4 GHz to 802.11a in 5 GHz), or even selecting a RF channel within a licensed spectral band, as described in the aforementioned related U.S. patent application entitled, "Use of Separate Control Channel to Mitigate Interference Problems in Wireless Networking." The three transport options provide spectral extensibility and backwards compatibility of RCS-enabled systems, which allows users to integrate older devices that can, for example, be made to move by an RCS-enabled system from channels experiencing high amounts of interference to others experiencing less interference, but may not be able to move to another unlicensed spectral band and/or to a licensed band.

Thus, using the cooperative protocol, remote (and local) peers can provide radio interference and spectrum details about their immediate surroundings. Significantly, one peer can notify a remote peer of localized interference, which can then be collected and used by the notified peer to initiate mitigation of the interference.

Figure 11:
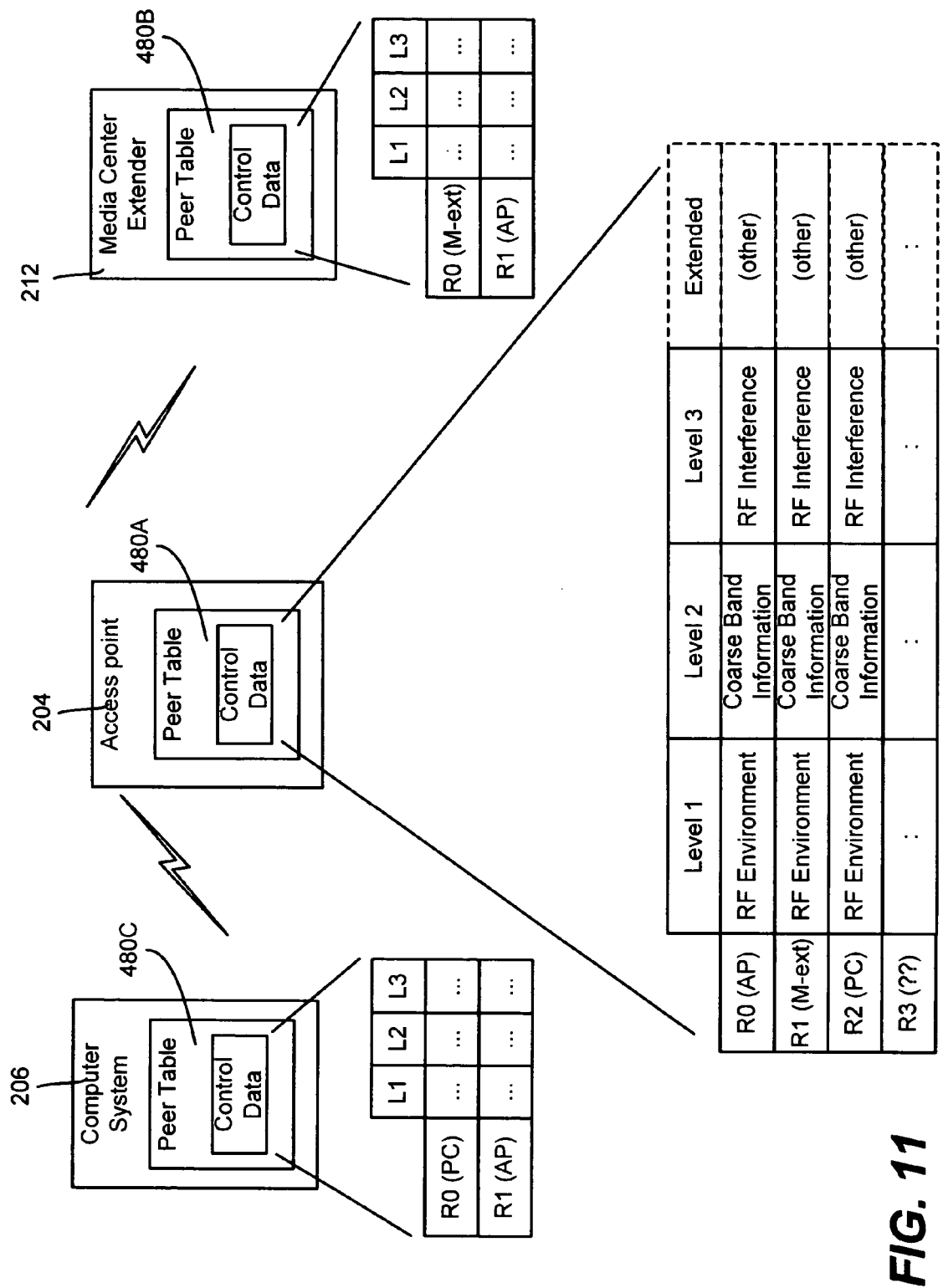
FIG. 11 is a block diagram generally representing how control data formatted according to the cooperative protocol is arranged in peer tables, in accordance with various aspects of the present invention.

As mentioned above, interference information, whether locally or remotely obtained, is formatted as a record that is maintained in a respective peer table 480 (FIG. 4) on each device, as also represented in FIG. 11 by peer tables 480A-480C. RF interference can be far-field (seen by all nodes at similar intensities) or near-field (seen only by certain nodes and not by others). In the near-field case, the condition at the receiver node is made available to the node that is transmitting directly to it. This information is held in the peer table.

The contents of the peer table (e.g., 480C) are shared by a local and a remote peer, and are used in deciding how the transmission from a node may be modified, primarily based on the condition at the receiver node. Various operations of the robust coexistence service are directed towards collecting environment data at various levels of granularity (in the level of details and in time) and making them available to the peers.

In one implementation generally represented in FIG. 11, the peer table 480 contains coexistence information at three levels of granularity, including a first level (Level 1) that contains environmental-type information, comprising generic information about the wireless node such as node ID (MAC Address, physical location), capabilities (WPA/ 802.11i, Transmission Type a/b/g and so forth), LAN environment (current BSSID, current SSID, current channel, current transmission power, current signal strength RSSI) and traffic parameters (such as packet loss, queue length, and number of re-transmissions).

A second level, Level 2, contains known band condition information for (typically all of) the 802.11 channels at a coarse level, such as the presence or absence of interference and so forth. This gives an overview of the entire 802.11 a/b/g bands, along with enough information that will allow a mitigation algorithm in an application program, WLAN MP driver or the like to decide to which band and/or channel to switch, and/or another way to avoid the interference. This enhanced RF information may include radio measurements per 802.11(k) and dynamic frequency and power adjustment information per 802.11(h).

A third level, Level 3, contains channel condition information comprising relatively detailed and specific information about the nature of any interferers in the currently operating 802.11 channel. Such information may include a time stamp indicating when the measurement was taken, the nature of the interferer, the location of the interferer in frequency, duty cycle, periodicity and any other types of detected or processed data, which may be used to pinpoint mitigation actions.

The full three levels of information need not be available all of the time, however when the three levels of information are available, the RCS mitigation operations typically will be the most effective. However, mitigation can be attempted using only Level 1 and Level 2, and some mitigation may still be possible in the event of only Level 1 availability.

As generally represented in FIG. 11 by the different sets of tables 480A-480C, in an access point environment, the information distribution system of each RCS keeps its own control data (coexistence information) in row zero (R0) of its respective peer table, along with that of its one-hop peer in row one (R1). For the purposes of mitigation, any node requires the knowledge of only its one-hop or peers. Thus, because the access point has multiple peers in this example, the access point keeps control data about itself (in row zero) and a record for each connected device completed to the extent the information is known, e.g., the three levels for an RCS-enabled device. In an ad-hoc network, devices track each other. The following table sets forth the information that is maintained for node types:

| Node Type | Peer Table Info |
|---|---|
| STA (station) in Infrastructure BSS | R0. control data about itself |
| | R1. control data about the AP with which it is associated |
| Access Point in Infrastructure BSS with N number of STAs | R0. control data about itself |
| | R1. control data about associated STA 1 |
| | — |
| | — |
| | RN. control data about associated STA N |
| STA in Ad Hoc BSS with a total of P number of STAs | R0. control data about itself |
| | R1. control data about associated STA 2 |
| | — |
| | RP. control data about associated STA P |

From an RCS point of view, the primary use of the control data at any node (e.g., node A) is to decide whether there is interference at node A (the transmitting node), whether there is interference at the one-hop away node (the receiving node), and if there is interference, what mitigation action is to be taken at node A. Secondarily, the control data may be used by other system functions by accessing the information stored in the access point's peer table. An example, non-exhaustive list of such functions includes a management function that chooses the access point that a station should associate with in an extended service set (ESS), in a mesh network, the best multi-hop route, and the ability to provide a single extensible table for additional information such as QoS options and selected parameters, traffic loads, location information, and so forth. Note that as represented in FIG. 11, the cooperative protocol allows for extended data may be maintained and exchanged as well, in addition to the data in the first three levels.

Although as described above the robust coexistence service is BSS-centric, and therefore no separate discovery of nodes is necessary because the formation of IBSS (or the Infrastructure BSS) has associated the operational nodes, capability discovery is still performed as part of exchanging control data. Thus, once an RCS-enabled system has associated with a WLAN AP, it begins looking for other RCS enabled systems through the discovery message exchange. During this exchange, the cooperative protocol and the transport for the exchange of the protocol is selected. The choice of transport can be either IP or Link Layer, as described above.

Figure 12B:
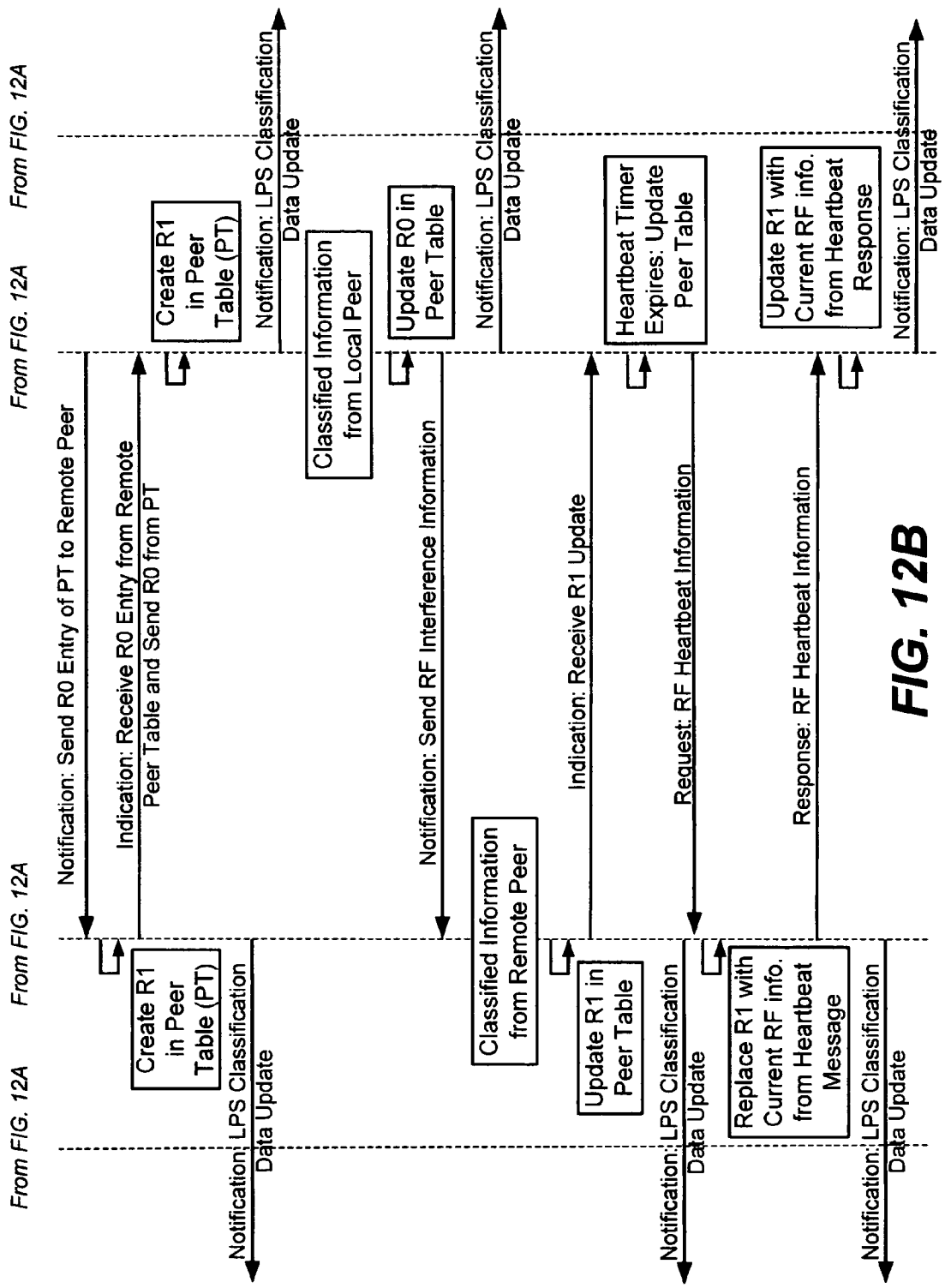

As generally represented in FIGS. 12A and 12B, the cooperative protocol mechanisms are negotiated during the discovery phase. As can be seen from FIG. 12A, queries and responses are exchanged to establish these mechanisms. Further, as represented in FIG. 12B, the control data is exchanged, that is, each nodes R0 information sent to the other node where it is recorded as row one (R1) information. Note that the access point is shown as creating the entry in row one (R1), however it is understood that it is the next available row, as control data from one or more previous peers may have taken previous rows beginning at row one. Also represented in FIG. 12B is the exchange of regular heartbeat information, which is accompanied by control data. As can be readily appreciated, only any changes to control data (the deltas) may be exchanged, however control data is relatively small and thus it is not a burden to simply provide the control data.

Figure 13A:
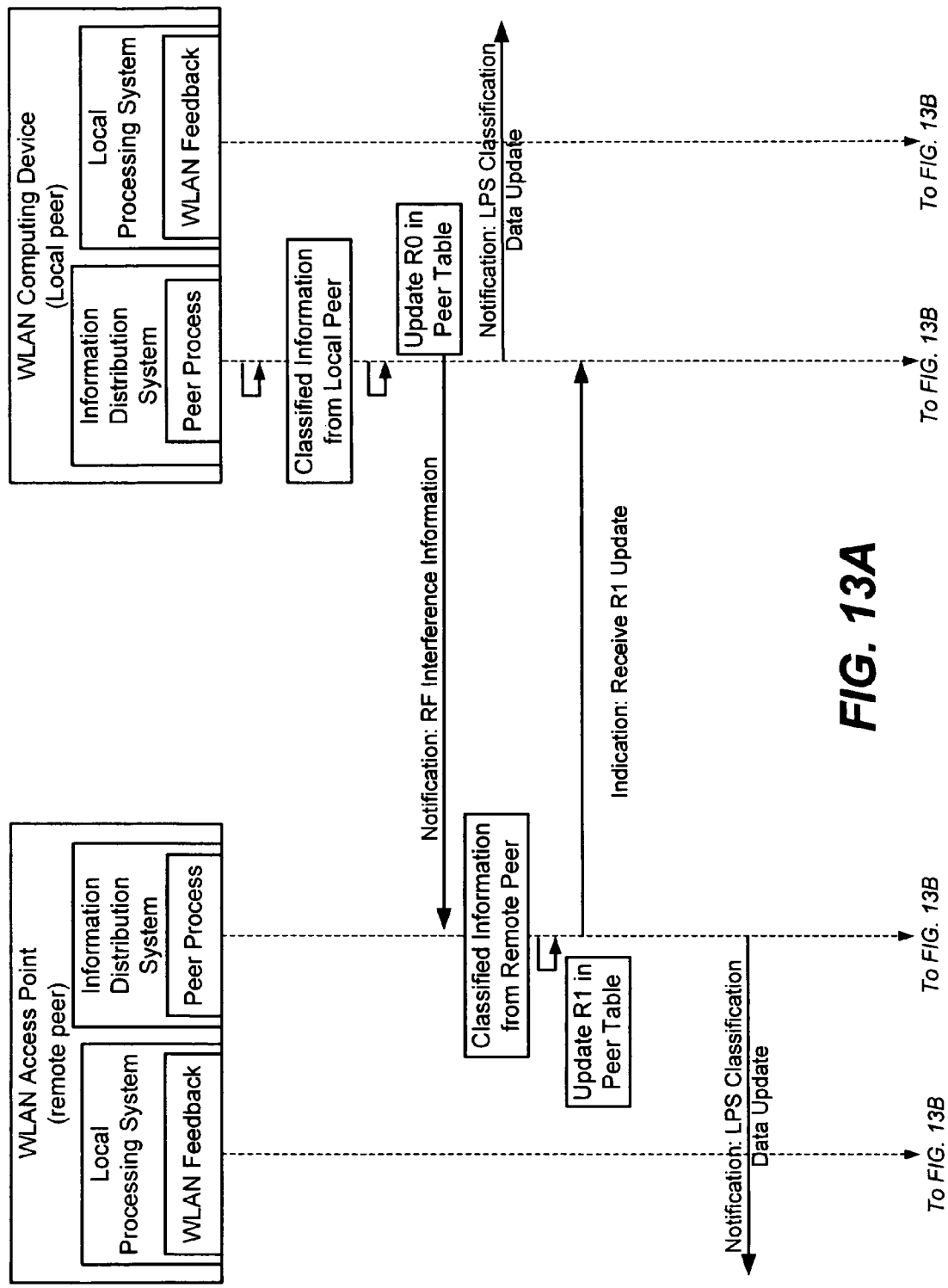
FIGS. 13A and 13B comprise a representation of an example ordering of control data being exchanged between peer devices according to the cooperative protocol, in accordance with various aspects of the present invention.
Figure 13B:
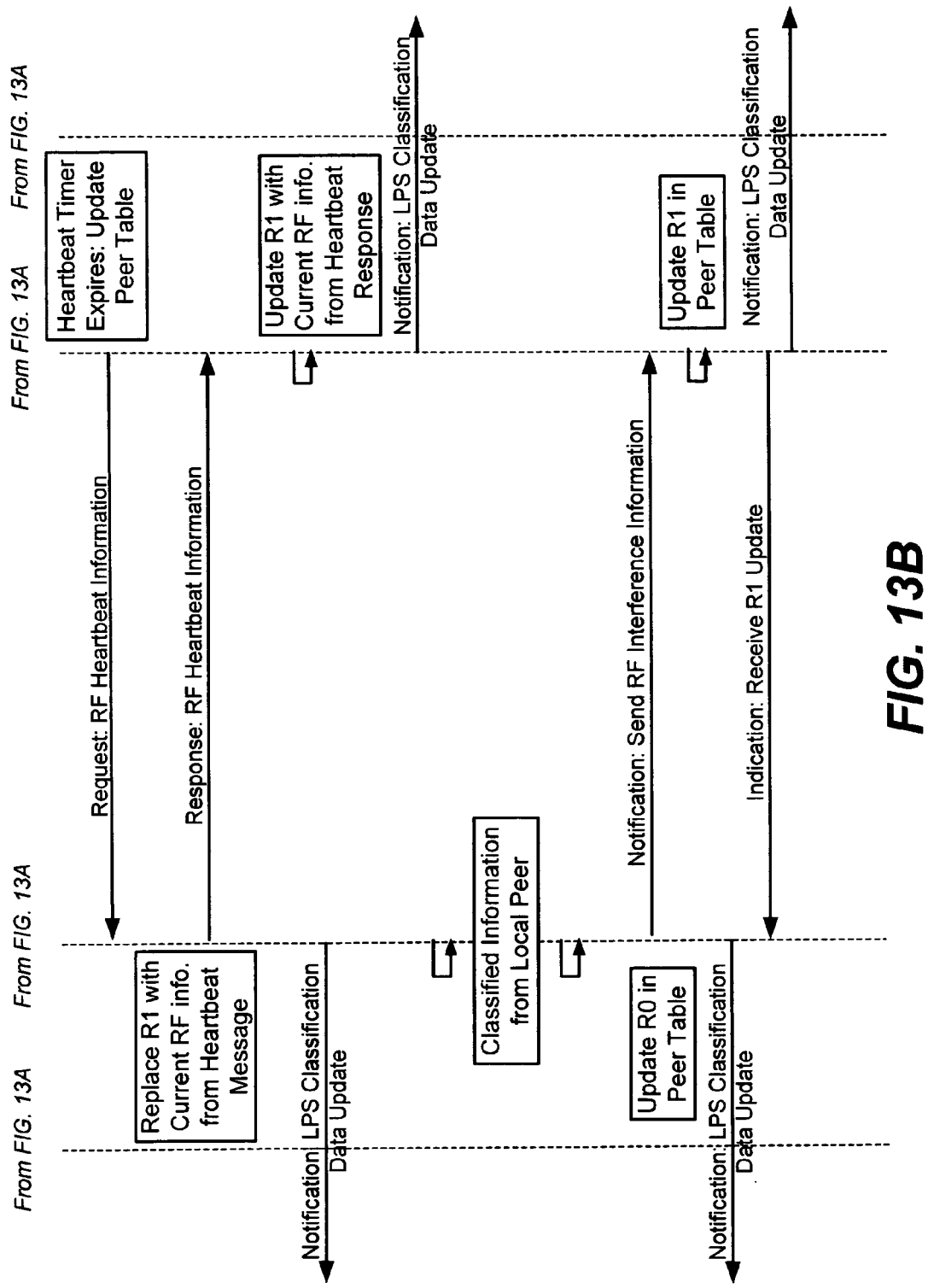

At this point discovery and setup is complete, and a steady-state has been reached between the two peers with respect to RF spectrum and interference information exchange. As represented in FIGS. 13A and 13B, the nodes remain connected and exchange their R0 control data, as long as heartbeats are sent and detected. Although not shown, one or both nodes may initiate a "Disconnect" whereby the RCS cooperative protocol session is ended and the peer table updated accordingly.

In this manner, a device may exchange control data with a peer for the purpose of mitigating the effects of interference on data communications. As can be understood, in an ad hoc/mesh type network, the peer tables may be extended to support multiple peers. Note that in future environments in which data may be communicated over multiple frequencies, such as one channel for receiving data and one for sending, different peer tables (or additional rows) may be used for separately maintaining the control data relevant to each frequency.

CONCLUSION

As can be seen from the foregoing detailed description, there is provided a protocol by which nodes in a wireless network exchange control data and thereby are able to avoid interference or mitigate the effects of interference on wireless network communications. The protocol allows negation of a transport from among different possible transport, and also provide different levels of granularity with respect to the control data such that devices can exchange different levels of control data based on their capabilities. The protocol allows for mitigation based on locally-sensed data and remotely-sensed interference data, thereby providing an improved wireless experience, including in the presence of RF interference.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a wireless computing environment including one or more nodes configured to communicate wirelessly, the computing environment being susceptible to interference such that wireless nodes may experience interference-related communication problems, a method of mitigating wireless communication problems between nodes, the method comprising:

at a local node in the network, obtaining control data for a remote node in the network from the remote node, wherein the control data includes processed RF spectrum interference-related information corresponding to interference at the remote node, wherein the remote node provides the control data as a result of:
  determining that a threshold level of interference has been achieved;
  receiving a registration request from a pluggable classifier module;
  sending a list of RF data providers with data formats supported to the classifier module;
  receiving a message from the classifier module for registering with one or more specific RF data providers;
  providing raw RF data to the pluggable classifier module using the one or more specific RF data providers, the pluggable classifier module being configured to identify raw RF data characteristics and being pluggable into the remote node such that classification of RF data at the remote node is extensible and dependent on classifier modules installed at the remote node; and
  the remote node determining that the local node is a first degree peer node to the remote node;
receiving a first registration request from a pluggable application component;
sending a list of classifiers that have previously registered with a communication service at the local node to the pluggable application component;
receiving a second registration request from the pluggable application component requesting to register for specific classifiers and data formats, and
providing the remotely-obtained control data to the pluggable application component at the local node using the data formats identified in the second registration request from the pluggable application component, wherein the pluggable application component determines actions related to mitigating problems caused by interference, and wherein mitigation actions determined at the local node are extensible dependent on what pluggable application components are installed at the local node.

2. The method of claim 1 further comprising, at the local node, obtaining local control data that includes RF spectrum interference-related information corresponding to the local node, and sending the local control data to the remote node.

3. The method of claim 2 wherein sending the local control data to the remote node comprises transmitting the control local data in conjunction with a heartbeat.

4. The method of claim 2 wherein sending the local control data to the remote node comprises receiving classified data sensed at the local node and transmitting the local control data corresponding to the classified data in conjunction with a notification.

5. The method of claim 1 further comprising, at a node in the network, discovering capabilities of the remote node.

6. The method of claim 1 wherein the local node comprises an access point, and further comprising, maintaining the remotely-obtained control data in a peer table.

7. The method of claim 1 wherein the remote node comprises an access point, and further comprising, maintaining the remotely-obtained control data in a peer table.

8. The method of claim 1 further comprising, negotiating a transport for communicating control data between the local node and the remote node.

9. The method of claim 2 wherein obtaining the remotely-obtained control data comprises receiving the control data in conjunction with a heartbeat.

10. The method of claim 2 wherein obtaining the remotely-obtained control data comprises receiving the control data in conjunction with a notification.

11. At least one computer-readable storage medium having computer-executable instructions, which when executed perform the method of claim 1.

12. At least one computer-readable storage medium having computer-executable instructions stored thereon, which when executed perform steps, comprising:
   receiving a registration request from a pluggable classifier module;
   sending a list of RF data providers with data formats supported to the classifier module;
   receiving a message from the classifier module for registering with one or more specific RF data providers;
   determining that a threshold level of interference has been achieved at a local node;
   as a result of determining that a threshold level of interference has been achieved, collecting raw RF data about the interference;
   routing the raw RF data about the interference to the pluggable classifier module using the data formats corresponding to RF data providers registered in the message from the classifier module, the pluggable classifier module being configured to identify raw RF data characteristics and being pluggable into the local node such that classification of RF data at the local node is extensible and dependent on classifier modules installed at the local node;
   storing locally-obtained control data in a first location of a peer table at the local node, the first location of the peer table being reserved for control data characterizing interference at the local node;
   discovering capabilities of a remote peer node in a wireless network with respect to exchanging the locally-obtained control data with remotely-obtained control data for interference at the remote peer node, the locally-obtained control data and remotely-obtained control data including RF interference-related information;
   exchanging the control data based on the capabilities discovered, including transmitting the locally-obtained control data to the peer node and receiving the remotely-obtained control data from the remote peer node; and
   storing the remotely-obtained control data from the peer node in the peer table in a location of the peer table reserved for peer node control data.

13. The computer-readable medium of claim 12 wherein discovering the capabilities of the peer node comprises receiving an indication that the peer node is running a robust coexistence service.

14. The computer-readable medium of claim 12 wherein discovering the capabilities of the peer node comprises receiving an indication that the peer node is capable of receiving the locally-obtained control data over a transport that is separate from a main data communication channel.

15. The computer-readable medium of claim 14 further comprising, negotiating the transport for communicating control data between the local node and the remote node.

16. The computer-readable medium of claim 12 wherein discovering the capabilities of the peer node comprises receiving an indication that the peer node is capable of receiving the locally-obtained control data in accordance with a cooperative protocol in which the locally-obtained control data is formatted into a plurality of levels of granularity.

17. The computer-readable medium of claim 12 wherein transmitting the locally-obtained control data to the peer node comprises transmitting the locally-obtained control data in conjunction with a heartbeat.

18. The computer-readable medium of claim 12 wherein transmitting the locally-obtained control data to the peer node comprises transmitting the locally-obtained control data in conjunction with a notification.

19. The computer-readable medium of claim 12 further comprising, providing the remotely-obtained control data to a component that determines actions related to mitigating problems caused by interference.

20. The computer-readable medium of claim 12 wherein the local node comprises an access point, and further comprising, maintaining the remotely-obtained control data in a peer table.

21. The computer-readable medium of claim 12 wherein the remote node comprises an access point, and further comprising, maintaining the remotely-obtained control data in a peer table.

22. The computer-readable medium of claim 12 further comprising, maintaining the remotely-obtained control data in a peer table, receiving an update to the remotely-obtained control data, and updating the peer table based on the update.

23. In a wireless computing environment including one or more nodes configured to communicate wirelessly, the computing environment being susceptible to interference such that wireless nodes may experience interference-related communication problems, a system for mitigating communication problems between nodes, the system comprising:
   a threshold detection mechanism in a local node that determines that a threshold level of interference has been achieved;
   a pluggable classifier module, the pluggable classifier module being configured to identify raw RF data characteristics and being pluggable into the local node such that classification of RF data at the local node is extensible and dependent on classifier modules installed at the local node, wherein the pluggable classifier module is added to the system by:
      sending a registration request from a pluggable classifier module;
      receiving a list of RF data providers with data formats supported at the classifier module; and
      sending a message from the classifier module for registering with one or more specific RF data providers;
   a discovery mechanism in the local node that queries a remote peer node for capability information with respect to mechanisms of the remote node, in which the mechanisms provide remotely-obtained control data that includes RF spectrum interference-related information; and
   a peer process at the local node that receives the remotely-obtained control data and maintains a record corresponding thereto in a peer table, the peer table accessible for determining a mitigation solution based on the interference-related information for communicating on a main data channel with the remote peer node.

24. The system of claim 23 wherein the discovery mechanism establishes a transport for receiving the control data from the remote peer node.

25. The system of claim 23 wherein the discovery mechanism establishes a particular cooperative protocol for receiving the remotely-obtained control data from the remote peer node.

26. The system of claim 23 wherein the discovery mechanism establishes that a version of a coexistence service is running on the remote peer node.

27. The system of claim 23 wherein the peer process receives an update to the remotely-obtained control data from the remote peer node, and updates the peer table based on the update.

28. The system of claim 23 wherein the peer process transmits locally-obtained control data to the remote peer node.

29. The system of claim 23 wherein the local node comprises an access point, and wherein the peer table contains an entry for at least one other peer node associated with the access point.

30. The system of claim 23 wherein the remote node comprises an access point.

31. The system of claim 23 wherein the local node is part of a mesh-type network, and wherein the peer table contains an entry for at least one other remote peer node associated with the access point.

* * * * *